United States Patent [19]

Bond

[11] Patent Number: 4,744,260
[45] Date of Patent: May 17, 1988

[54] APPARATUS FOR TURNING OVER A WORKPIECE

[76] Inventor: Irvin D. Bond, 10270 Allen Rd., Clarkston, Mich. 48016

[21] Appl. No.: 886,677

[22] Filed: Jul. 18, 1986

Related U.S. Application Data

[63] Continuation-in-part of Ser. No. 829,165, Feb. 14, 1986, Pat. No. 4,715,242.

[51] Int. Cl.$^4$ .............................. F16H 21/46; B25J 9/00
[52] U.S. Cl. .......................................... 74/98; 414/772
[58] Field of Search .................... 74/98; 414/732, 733, 414/738, 754, 758, 767, 772, 776; 164/409

[56] References Cited

U.S. PATENT DOCUMENTS

| | | | |
|---|---|---|---|
| 976,918 | 11/1910 | Richards | 74/323 |
| 1,786,608 | 12/1930 | Halstead | 414/733 |
| 2,224,975 | 12/1940 | McNamara | 414/772 |
| 2,580,472 | 1/1952 | Smith | 414/732 |
| 2,697,529 | 12/1954 | Hubbell et al. | 414/732 |
| 3,062,388 | 11/1962 | Hunter | 414/776 |
| 3,896,939 | 7/1975 | Harris | 414/737 |
| 4,299,533 | 11/1981 | Ohnaka | 74/99 R |
| 4,331,416 | 5/1982 | Berecz | 414/772 |
| 4,398,863 | 8/1983 | Shum | 414/773 |
| 4,485,685 | 12/1984 | Bond | 74/103 |
| 4,635,493 | 1/1987 | Buckley | 74/103 |

FOREIGN PATENT DOCUMENTS 881929 9/1971 Canada .................................. 414/737

*Primary Examiner*—Lawrence J. Staar
*Attorney, Agent, or Firm*—Charles W. Chandler

[57] ABSTRACT

Apparatus for turning over a workpiece, such as a metal stamping, including a turnover shaft. A pneumatic piston and cylinder rotates the turnover shaft in a cammed rate of motion from an initial position to a final position. A vacuum-operated workpiece support is rotated with the turnover shaft and is adapted to engage a metal stamping to swing it with the turnover shaft. The workpiece support is connected by a gear box to the turnover shaft in such a manner that as the workpiece is swung to an upside down position, it is also rotated about a second axis with respect to the turnover shaft.

10 Claims, 4 Drawing Sheets

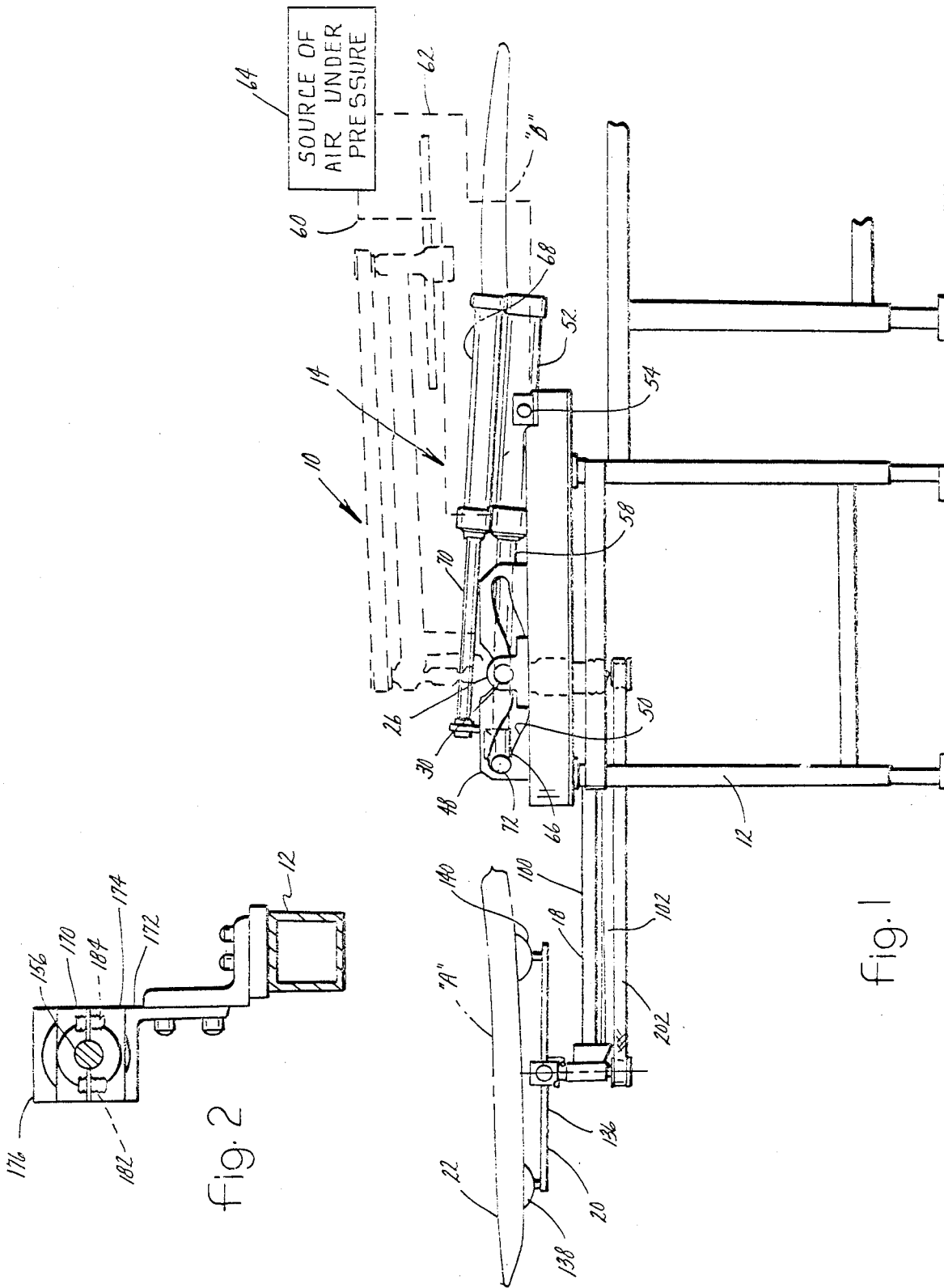

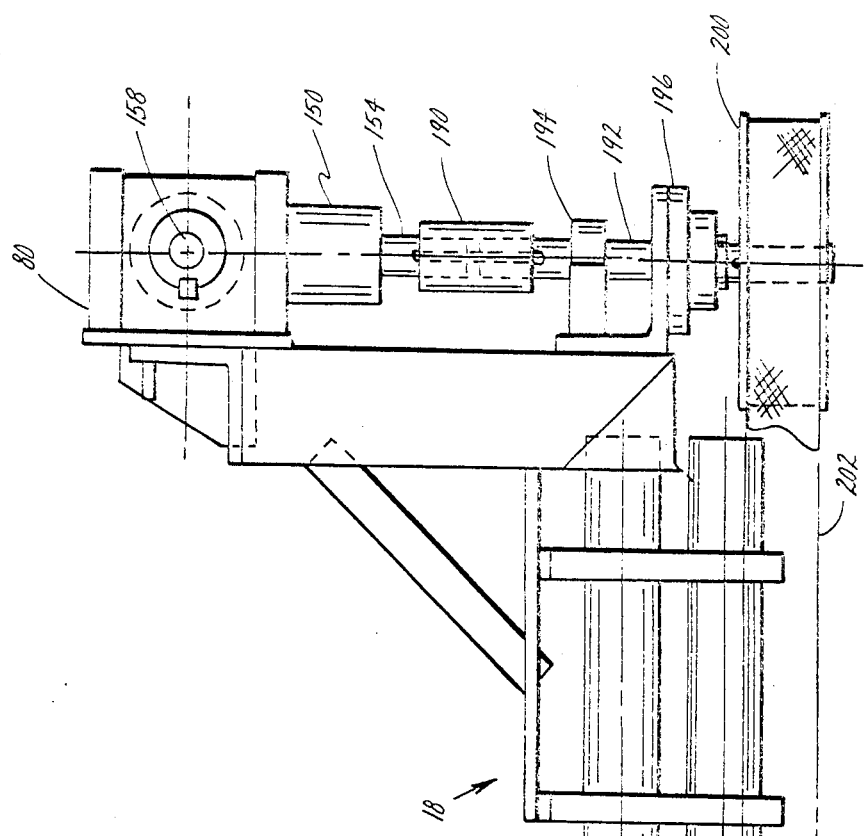
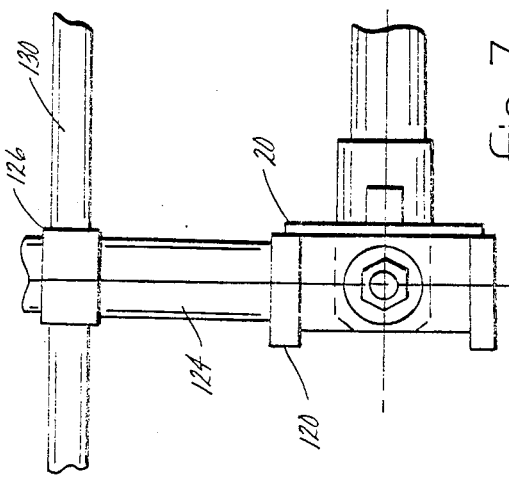

APPARATUS FOR TURNING OVER A WORKPIECE

CROSS-REFERENCE TO RELATED APPLICATION

This application is a continuation-in-part of my patent application entitled "Apparatus for Turning A Workpiece Over Along a Twisting Path of Motion", filed Feb. 14, 1986, Ser. No. 829,165 now U.S. Pat. No. 4,715,242.

BACKGROUND OF THE INVENTION

This invention is related to apparatus for turning over a workpiece, such as a metal stamping, along a twisting path of motion, and more particularly to such an apparatus comprising a workpiece support arm having one end connected to a turnover shaft and its other end carrying workpiece supporting device, such as a vacuum pickup means, in such a manner that as the turnover shaft is being rotated, the vacuum pickup means is both swung with the turnover shaft and rotated with respect to the arm.

There are many industrial applications where a workpiece is turned over between a pair of work stations. In my aforementioned application, I disclosed an apparatus employing a gear box having a pair of sprockets mounted in such a way as to rotate the workpiece supporting arm about its longitudinal axis as the turnover shaft is being rotated. This provided special advantages in reorienting the workpiece with respect to the arm as the workpiece is being turned upside down.

SUMMARY OF THE INVENTION

The broad purpose of the present invention is to provide an improved means for turning over a workpiece while reorienting the workpiece with respect to the turnover arm. A right angle gear box is mounted on the turnover shaft and has a pair of internally connected cross-shafts. A pinion shaft is internally connected to the cross-shafts, and carries a sprocket connected by an endless belt to a second sprocket on the outer end of the turnover arm. The vacuum pickup means is connected to the second sprocket such that it is rotated with respect to the turnover arm, as both the turnover arm and the vacuum pickup means are being swung by the turnover shaft.

The direction of rotation of the workpiece with respect to the turnover arm is determined by clamping one or the other of the two gear box cross-shafts. The ratio of the rotation of the workpiece with respect to the swinging of the turnover arm is changed by changing the sprockets supporting the endless belt.

Preferably, the power means for rotating the turnover shaft provides a cammed rate of motion such that the workpiece is initially reoriented in a slow rate of motion, accelerated during its intermediate path and then slowed down as the workpiece approaches its destination.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a view of turnover apparatus illustrating the preferred embodiment of the invention, swinging a metal stamping to an upside down position;

FIG. 2 is an enlarged fragmentary view as seen along lines 2—2 of FIG. 4;

FIG. 6 is a fragmentary view of the pickup arm; and

FIG. 7 is a fragmentary plan view of the workpiece supporting device illustrated in FIG. 6.

DESCRIPTION OF THE PREFERRED EMBODIMENT

Figure 3:
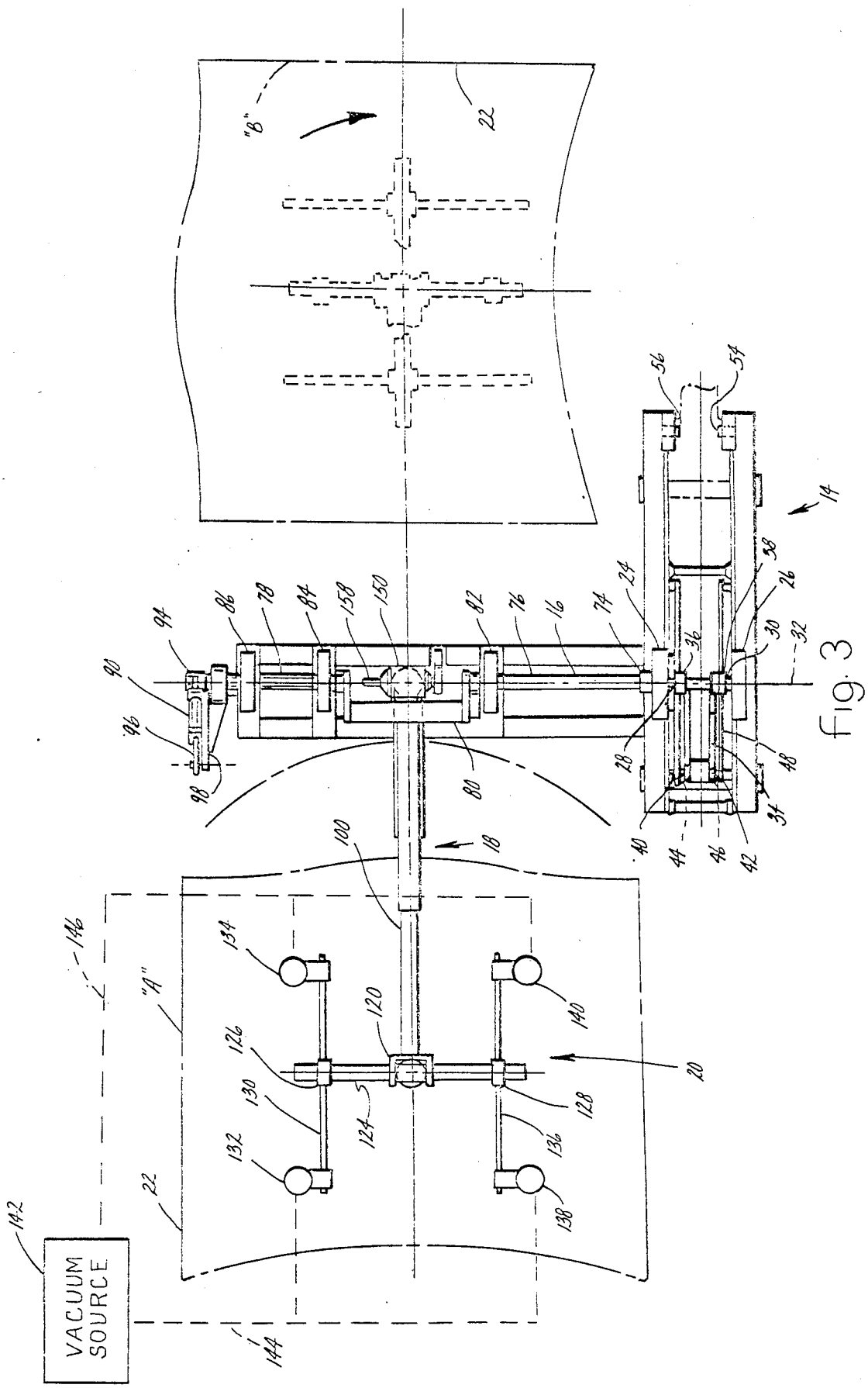
FIG. 3 is a fragmentary plan view of the apparatus of FIG. 1 in which the stamping is being rotated in the direction of the arrow.
Figure 4:
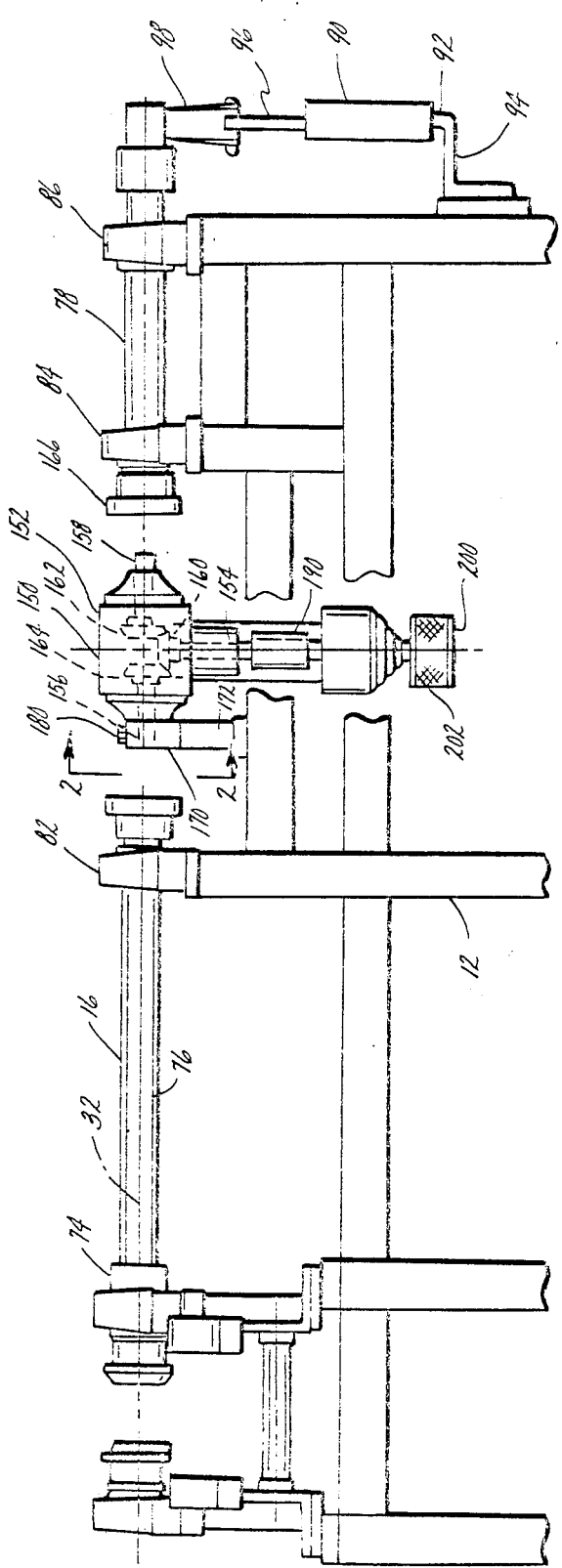
FIG. 4 is an enlarged, fragmentary view as seen from the left side of FIG. 1.

Referring to the drawings, a preferred turnover apparatus 10 is illustrated in FIGS. 1, 3 and 4 and includes a base 12. Power means 14, mounted on the base, is operatively connected to turnover shaft means 16. Arm means 18 has one end connected to the turnover shaft means, and its opposite end supporting a vacuum-operated pickup device 20. Pickup device 20 is adapted to turn over workpiece 22 from a position illustrated in FIG. 1 at "A" to an upside down position illustrated in phantom at "B", while being reoriented in the direction of the arrow, as viewed in FIG. 3.

Power means 14 is described in greater detail in my co-pending patent application, U.S. Ser. No. 682,847, filed Dec. 18, 1984, now U.S. Pat. No. 4,593,573 and comprises a pair of pillow blocks 24 and 26 mounted on the base and supporting a pair of spaced shaft means 28 and 30, which are aligned along a common axis of rotation 32. Axis 32 coincides with the axis of rotation of turnover shaft means 16. Yoke 34 is attached to a pair of collars 36 and 38 mounted on shaft means 28 and 30, as illustrated in FIG. 3. The yoke has a pair of sidewalls 40 and 42 having elongated slots 44 and 46.

Cam plate 48 is mounted on the base adjacent shaft 30. The cam plate has an elongated, curved cam slot 50 having a midsection disposed about the axis of rotation of the two shafts, as best shown in FIG. 1.

Power means 14 includes pneumatic cylinder 52 mounted on the base by pivot means 54 and 56. The cylinder has a pneumatically-actuated piston rod 58 moved along a linear path of motion with respect to the cylinder. The cylinder is connected by a pair of conduit means 60 and 62 to source of air under pressure 64, in the manner well known to those skilled in the art, so that the piston rod moves in a uniform rate of motion with respect to the cylinder.

The outer end of the piston rod carries clevis 66.

Hydraulic cylinder 68 is mounted in tandem with cylinder 52 and has piston rod 70 connected by the clevis to the outer end of piston rod 58 so that the two piston rods move together to reduce any fluctuation in piston rod 58 as it is being extended or retracted. Piston rod 70 functions in a manner similar to a shock absorber.

Roller means 72 are carried on the outer end of piston rod 58. Roller means 72 extend laterally with respect to the piston rod and are mounted in cam slot 50, and slots 44 and 46 of the yoke. Thus, as piston rod 58 is moved from a fully retracted position toward a fully extended position, the end of the piston rod follows the curvature of cam slot 50. The piston rod also swings the yoke and thereby rotates shafts 28 and 30. As the piston rod swings the yoke in the opposite direction, the yoke rotates the two shafts in the opposite direction.

The relative motion between shafts 28 and 30 and the piston rod is defined by the shape of cam slot 50. For this reason the slot is formed with a predetermined curvature depending upon the acceleration and deceleration desired of the workpiece.

As shown in FIG. 3, shaft 28 is connected by coupling 74 to turnover shaft 76 which is a part of shaft means 16. As the piston rod is extended from cylinder 52 in a uniform rate of motion, turnover shaft means 16 will initially move in an increasing rate of rotation. When roller 72 passes the midpoint of the cam slot, the turnover shaft will continue its motion in a decreasing rate of rotation. The curvature of cam slot 50 thus defines the rate of rotation of the turnover shaft.

Referring to FIG. 3, turnover shaft means 16 includes a second turnover shaft 78 connected by bracket 80 to shaft 76. Shaft 76 and shaft 78 are mounted on bearing means 82, 84 and 86, all mounted on the base. Thus, shafts 76 and 78 and bracket 80 rotate as a unit about axis 32 according to the motion of piston rod 58.

Referring to FIGS. 3 and 4, hydraulic cylinder 90 is mounted by pivot means 92 on a bracket 94 carried on base 12. Cylinder 90 has a piston rod 96 connected by arm 98 to the outer end of shaft 78 in such a manner as to cushion the motion of the shaft as the workpiece is being lowered from a raised position.

Referring to FIGS. 1, 3 and 6, arm means 18 comprises a pair of tubular arm members 100 and 102, having their inner ends attached to bracket 80.

As viewed in FIG. 6, bearing housing 104 is attached to the outer ends of the two arms, and rotatably supports spindle 106 for rotation about axis 108. Axis 108 is spaced from turnover axis 32 and is generally at right angles to the longitudinal axis of arm means 18. The spindle is mounted on spaced bearings 110 and 112, and thrust bearings 114 and 116. Sprocket 118 is carried on the lower end of the spindle, and bracket 120 is mounted on the upper end of the spindle. The bracket supports cross arm 124. Cross arm 124 carries two brackets 126 and 128.

Figure 5:
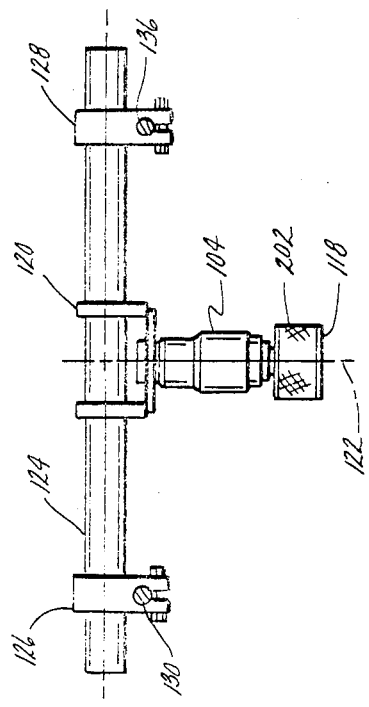
FIG. 5 is a fragmentary elevational view of the workpiece supporting device.

As viewed in FIGS. 3 and 5, bracket 126 carries arm 130 which supports a pair of vacuum pick-up devices 132 and 134. Bracket 128 carries arm 136 which in turn supports a pair of vacuum pick-up devices 138 and 140.

Vacuum source 142 is connected by conduit means 144 and 146 to vacuum pick-up devices 132, 134, 138 and 140 so that the four vacuum pick-up devices cooperate to form a releasable connection between workpiece 22 and arm means 18. The arrangement is such that when the vacuum pick-up devices are connected to the workpiece, the workpiece can then be swung in an arc around the axis of rotation 32 of the turnover shaft to transfer the workpiece from position "A" to position "B".

Referring to FIGS. 3, 4 and 6, right angle gear box 150 is mounted on the midsection of bracket 80. Gear box 150 preferably is of the type having a housing 152 having a rotary pinion 154 and a pair of rotary cross members 156 and 158. Pinion 154 has gear 160 in mesh with gear 162 carried by cross member 156, and meshed with a gear 164 carried by cross member 156.

Cross member 156 is seated in clamping device 170, which is clamped to the cross member to rotate the pinion 154.

Referring to FIGS. 2 and 4, clamping device 170 is mounted on bracket means 172 which is fastened to the base. Clamping device 170 comprises a lower clamping member 174 and an upper clamping member 176.

Fastener means 180 is connected both to the upper clamping member and to the lower clamping member. A pair of internally mounted springs 182 and 184 bias the two clamping members away from one another, as illustrated in FIG. 2. Thus, when the user wants to connect cross member 156 to the base, he tightens fastener 180. When he loosens fastener 180, cross member 156 is then free to rotate with the gear housing. The user can mount the clamping device on the base adjacent cross member 158. By clamping cross member 158 to the base, with cross member 156 free to rotate, pinion 154 will rotate in the opposite direction as the turnover shaft is being rotated. By this means, the user can control the direction of rotation of pinion 154.

Referring to FIGS. 6, pinion 154 is connected by coupling means 190 to shaft 192 which is supported by bearing means 194 and 196 on the lower end of bracket 80. Sprocket 200 is attached to the lower end of shaft 192. An endless belt 202 is looped around both sprocket 200 and sprocket 118 so that pick-up device 20 rotates on arm means 18 in accordance with the rotation of pinion 154. However, the ratio of rotation is a function of the ratio of the diameters of sprockets 118 and 200. The user can change the ratio of rotation between the workpiece about axis 108 and the turnover shaft about axis 32 by changing either sprocket 118 or sprocket 200.

It is to be understood that I have described an improved turnover device for turning a workpiece, such as a large metal stamping, from a first position to an upside down position. In the process of turning over the workpiece, it is reoriented with respect to the turnover arm.

Having described my invention, I claim:

1. Apparatus for turning a workpiece over, comprising:

a base;

a turnover shaft mounted on the base, and power means for rotating the turnover shaft about a first axis of rotation between a first rotated position and a second rotated position;

arm means mounted on the turnover shaft so as to be rotated therewith about said first axis of rotation;

workpiece support means;

first means mounting the workpiece support means on the arm means such that the workpiece support means is rotatable with respect to the arm means about a second axis of rotation that is non-parallel with respect to the first axis of rotation and spaced from said first axis by a fixed distance, as the arm means and the workpiece support means are rotated about the first axis of rotation;

gear box means including a gear box housing mounted on the turnover shaft, the gear box means including a first rotary member connected to the base, a second rotary member connected to the first rotary member so as to be rotatable with respect to the first rotary member, and means connecting the second rotary member to the workpiece support means such that the workpiece support means is rotated in a timed relationship about the second axis of rotation as the turnover shaft is being rotated about said first axis of rotation.

2. A combination as defined in claim 1, in which the means connecting the workpiece support means to the second rotary member of the gear box means comprises a first sprocket means connected to the workpiece support means so as to be rotatable therewith, a second sprocket means connected to the second rotary member, and endless belt means mounted on the first sprocket means and the second sprocket means such that the second sprocket means is rotated as the first sprocket means is being rotated.

3. A combination as defined in claim 1, in which the gear box means includes a pair of rotary cross members connected to the second rotary member, and including clamping means mounted on the base and adapted to be operatively connected to a selected one of the pair of cross members in such a manner that as the turnover shaft is being rotated, the workpiece support means is rotated in a direction depending upon which of the pair of rotary cross members is clamped to the base.

4. A combination as defined in claim 1, in which the power means is operative to rotate the turnover shaft in a first direction and then in the opposite direction.

5. A combination as defined in claim 1, including cam means connected between the power means and the turnover shaft to rotate same at a predetermined variable rate of motion.

6. A combination as defined in claim 1, in which the gear box means comprises a right angle gear box.

7. A combination as defined in claim 1, including a piston and cylinder means connected to the turnover shaft for cushioning the motion of the workpiece support means as it is being lowered from a raised position.

8. Apparatus for turning a workpiece over, comprising:
a base;
turnover shaft means mounted on the base, and power means for rotating the turnover shaft means about a first axis of rotation between a first rotated position and a second rotated position;
workpiece support means;
first means mounted on the turnover shaft and supporting the workpiece support means for rotation about a second axis with respect to the turnover shaft and spaced with respect to the first axis by a fixed distance, the second axis being non-parallel with respect to the first axis of rotation; and
gear means mounted on the turnover shaft and having a first rotary member, and a second rotary member, and means connecting the first rotary member to the base and the second rotary member to the workpiece support means such that as the turnover shaft is being rotated about the first axis, the workpiece support means is rotated about said second axis.

9. Apparatus as defined in claim 8, in which the turnover shaft is elongated and is rotated about a first axis that coincides with the longitudinal axis of the turnover shaft.

10. Apparatus as defined in claim 8, in which the first rotary member is rotatable about an axis collinear with the axis of rotation of the turnover shaft, and the second rotary member is rotatable about an axis parallel to the second axis of rotation.

* * * * *